United States Patent [19]
Iwase et al.

[11] Patent Number: 4,547,796
[45] Date of Patent: Oct. 15, 1985

[54] DIGITAL COLOR VIDEO SIGNAL ENCODER

[75] Inventors: Seiichiro Iwase; Takashi Asaida; Fumio Nagumo, all of Kanagawa, Japan

[73] Assignee: Sony Corporation, Tokyo, Japan

[21] Appl. No.: 506,699

[22] Filed: Jun. 22, 1983

[30] Foreign Application Priority Data

Jun. 28, 1982 [JP] Japan ................................. 57-111066

[51] Int. Cl.$^4$ ............................................. H04N 9/38
[52] U.S. Cl. ......................................... 358/13; 358/16
[58] Field of Search ........................ 358/13, 16, 23, 24

[56] References Cited
U.S. PATENT DOCUMENTS

4,275,411 6/1981 Lippel .................................... 358/13
4,396,937 8/1983 Reitmeier et al. ..................... 358/13

Primary Examiner—John W. Shepperd
Attorney, Agent, or Firm—Lewis H. Eslinger; Alvin Sinderbrand

[57] ABSTRACT

A digital encoder for use with digital luminance and chrominance signals having black levels includes a level adjusting circuit which adjusts the chrominance and luminance signals to establish a predetermined relationship between the black levels of the level-adjusted chrominance and luminance signals, a chrominance signal with a predetermined relatively large dynamic range thereof modulating circuit which generates a modulated chrominance signal from the level-adjusted chrominance signal, an adding circuit which receives the modulated chrominance signal and the level-adjusted luminance signal and provides an encoded color video signal therefrom, an attenuator circuit which attenuates the encoded color video signal and a circuit for combining sync and burst signals with the attenuated encoded color video signal and with a predetermined pedestal level to provide a composite color video signal within the predetermined dynamic range.

12 Claims, 14 Drawing Figures

DIGITAL COLOR VIDEO SIGNAL ENCODER

BACKGROUND OF THE INVENTION

1. Field of the Invention

This invention relates to digital color video signal encoders used in color video cameras, and more particularly, to a digital color video signal encoder which reduces the influence of quantum noise on the luminance and chrominance signal components.

2. Description of the Prior Art

A digital color video camera has been proposed which generates digital output signals comprised of eight-bit digital words. An eight-bit digital word can, of course, assume any one of two hundred fifty-six values. Thus, the eight-bit composite video signal from a digital video camera can be said to have a dynamic range of two hundred fifty-six graduations or steps.

However, the full dynamic range of the eight-bit words is not utilized in prior art digital video cameras. Rather, the composite video signals have an upper limit or white level with a selected digital value of "200", and a lower limit or pedestal or black level having a digital value of "60". Thus, the composite digital video signal has a dynamic range of 140 steps or graduations.

The composite video signal from the digital video camera includes a synchronizing signal having a level reduced by a digital value of "56" from the pedestal or black level of "60". Accordingly, the digital value of the composite video signal is "4" for the synchronizing signal. The lower limit of the composite video signal thus has a tolerance or limiting range of "4". The lower limit of the signal in the video region has a digital value of "60" because of the presence of the synchronizing signal. The upper limit of the composite video signal also has to have a tolerance or limiting range. Therefore, the 100% white level of the composite video signal usually has a digital value of "200", rather than the maximum digital value of "255". Thus, the dynamic range of the signal carrying the video information has 200 minus 60, or 140, graduations or steps.

According to one prior art video camera, the dynamic ranges of the luminance signal Y and the chrominance signals I and Q, each being a component signal for the composite signal generated by the video camera, have been compressed to 140 graduations or steps prior to being combined to form the composite signal. However, the component signals Y, I and Q do not include synchronizing signals, which must be added later to the composite signal. Thus, it is desirable to utilize the full range available in an eight bit digital signal in order to reduce quantum noise and its undesirable effects on the composite video signal.

OBJECTS AND SUMMARY OF THE INVENTION

According, it is an object of the present invention to provide a digital color video signal encoder which obviates the aforesaid defects of prior art digital color video signal encoders.

It is an another object of the present invention to provide a digital color video signal encoder which has a wide dynamic range for chrominance and luminance signals so as to reduce the influence of quantum noise on the composite color video signal produced therefrom.

It is yet a further object of the present invention to provide a digital color video signal encoder which adjusts the dynamic ranges of the chrominance and luminance signals and the composite signal produced therefrom.

It is still a further object of the present invention to provide a digital color video signal encoder suitable for use in a color video camera.

In accord with the present invention, a digital encoder for use with digital luminance and chrominance signals having black levels includes level adjusting means for adjusting the chrominance and luminance signals to establish a predetermined relationship between the black levels of the level-adjusted chrominance and luminance signals, chrominance signal modulating means for generating a modulated chrominance signal from the level-adjusted chrominance signal, adding means receiving the modulated chrominance signal and the level-adjusted luminance signal and providing an encoded color video signal therefrom, and attenuator means for attenuating the encoded color video signal.

The above, and other objects, features and advantages of the present invention will be apparent from the following detailed description of illustrative embodiments thereof which is to be read in connection with the accompanying drawings.

DESCRIPTION OF THE PREFERRED EMBODIMENTS

Figure 1:
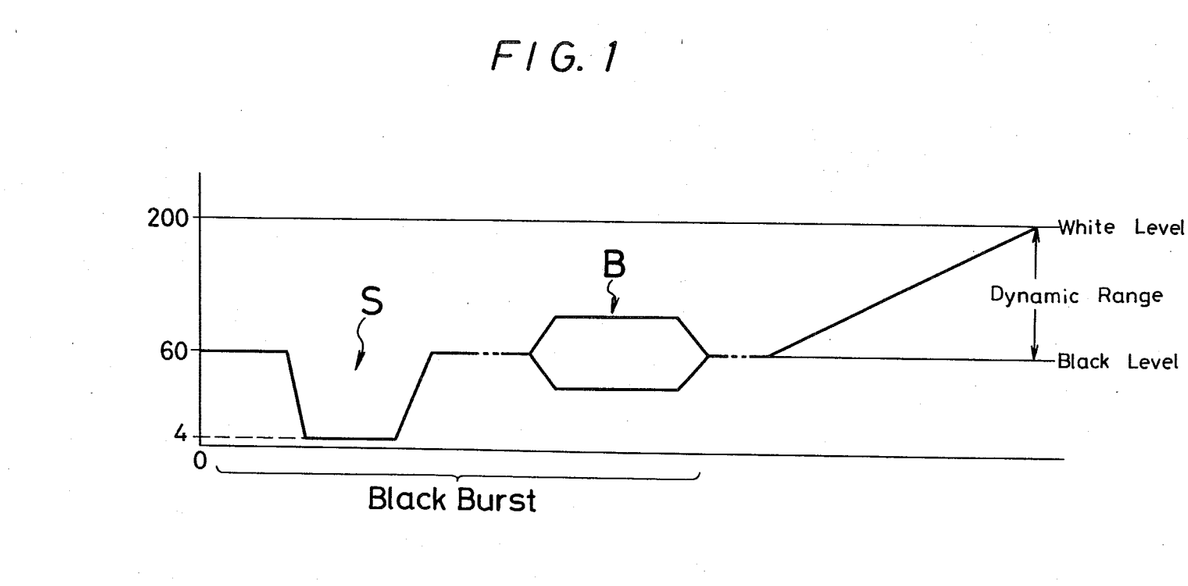
FIG. 1 is a schematic diagram illustrating the dynamic range of a composite signal generated by a color video camera.

Referring to the drawings, and initially to FIG. 1 thereof, a digital composite video signal from a color video camera is illustrated and includes a black burst video signal with horizontal and vertical and synchronizing signals S and a burst signal B. The black burst video signal of FIG. 1 does not include other video information, however, as such information follows the black burst signal. The illustrated digital composite signal is comprised of eight bit words. It is to be appreciated by one of skill in the art that words having other numbers of bits can be used with the present invention, and such words would require changes in the numerical values associated with the dynamic ranges discussed herein.

In FIG. 1, the black level of the video signal has a digital value of "60". The white level of the video signal has a digital value of "200". Accordingly, the dynamic range of the video signal ranges from a digital value of "60" to a digital value of "200", or 140 graduations or steps. It is to be noted that the digital composite signal has a tolerance or limiting range of a digital value of "4" at its lower limit.

Figure 2:
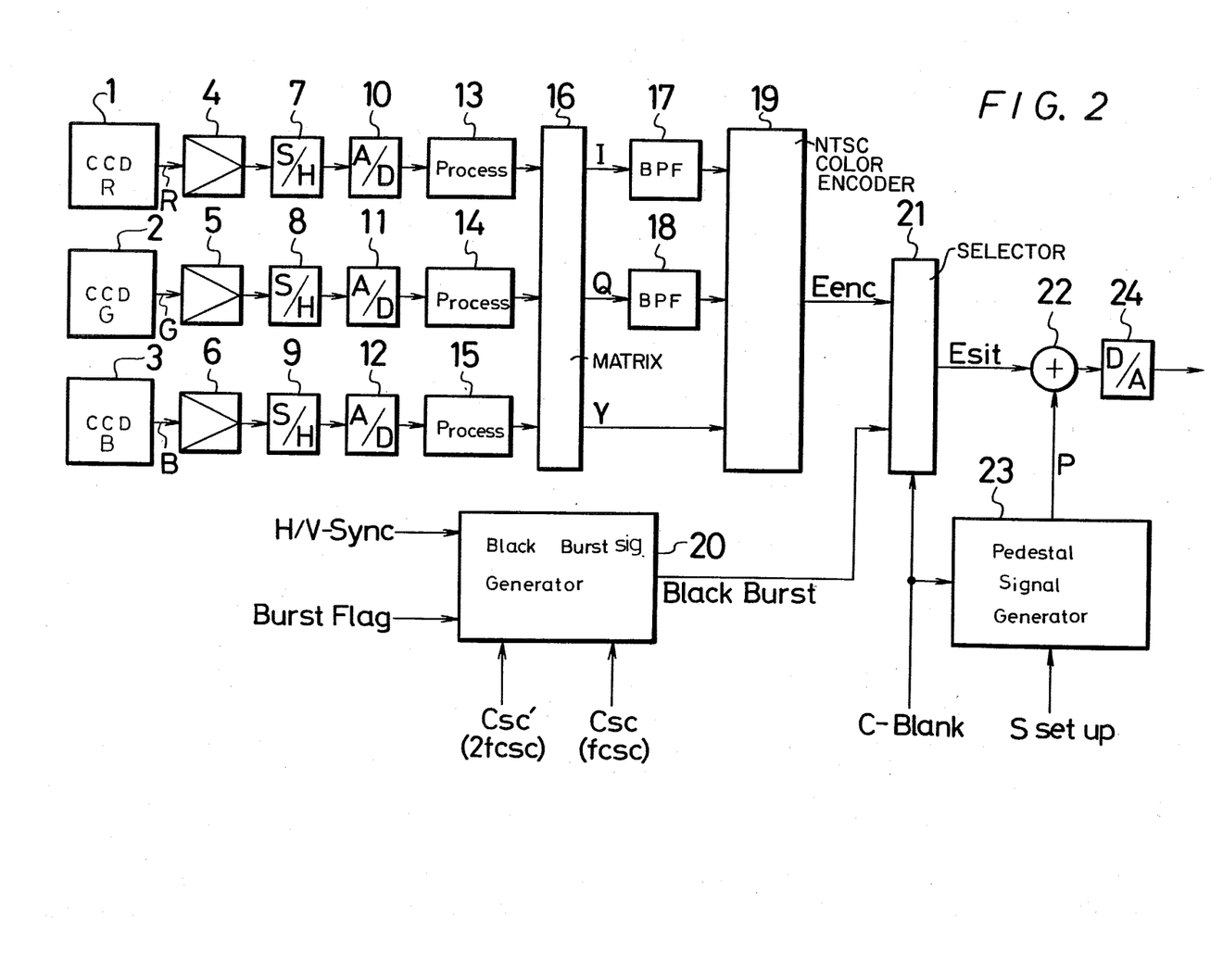
FIG. 2 is a block diagram of a color video camera.

In the color video camera of FIG. 2, a solid state image pickup element 1 generates a red signal component R. A second solid state image pickup element 2 generates a green signal component G, while a third solid state image pickup element 3 generates a blue signal component B. Solid state image pickup elements 1, 2, and 3 each can comprise, for example, a CCD (charge-coupled device). The red, green and blue signal components R, G and B from solid state image pickup elements 1, 2 and 3 are respectively supplied to preamplifiers 4, 5 and 6 where they are amplified and then supplied to sample and hold circuits 7, 8 and 9, each performing a sampling function and a waveform shaping function on the signals supplied thereto. The output signals from sample and hold circuits 7, 8 and 9 are supplied to analog to digital converters 10, 11 and 12 where the signals are converted from analog to digital form. The digital signals from analog to digital converters 10, 11 and 12 are supplied to signal processors 13, 14, 15 where operations such as gamma-correction, pedestal level adjustment, clamping, clipping and the like are performed. The processed signals from signal processors 13, 14 and 15 are supplied to a matrix circuit 16 which generates a luminance signal Y and chrominance signals I and Q in accord with the following equations:

$$Y = 0.03R + 0.059G + 0.11B$$

$$I = 0.60R - 0.28G - 0.32B$$

$$Q = 0.21R - 0.52G - 0.31B$$

White balance circuits (not shown) adjust the levels of chrominance signals I and Q so that an accurate white balance is obtained therefrom. Chrominance signals I and Q are supplied through band-pass filters 17 and 18 and thence, together with luminance signal Y, to an NTSC color encoder 19. Color encoder 19 performs a color encoding operation on chrominance signals I and Q according to the equation:

$$Eenc = Y + Q\sin(\omega csc \cdot t + 33°) + I\cos(\omega csc \cdot t + 33°)$$

to generate an encoded signal Eenc. (In the above equation, csc represents the angular velocity of a color subcarrier signal.) Color encoder 19 will be described more fully hereinbelow.

A black burst signal generator 20 generates a black burst signal which includes horizontal and vertical synchronizing signals S and a burst signal B without video information, as described hereinbefore. Black burst signal generator 20 receives as its inputs a horizontal and vertical synchronizing signal H/V-Sync, a burst flag signal Burst Flag, and a signal color subcarrier signal Csc having a frequency fcsc, and a signal Csc' having a frequency 2 fcsc (twice the frequency fcsc of color subcarrier signal Csc). A selector 21 receives the black burst signal from black burst signal generator 20 and encoded signal Eenc from color encoder 19 and alternately supplies black burst signal Black Burst and encoded signal Eenc as composite color video signal Esit to an adding circuit 22 in response to a switching or color blanking signal C-Blank (see FIG. 3F). It is to be appreciated that the video information and the black burst signal Black Burst are shifted in time with a delay therebetween during each horizontal period of the video signal in response to the composite blanking signal C-Blank.

Encoded signal Eenc from color encoder 19 can be a composite color video signal. However, in order to discriminate encoded signal Eenc from the composite color video signal Esit supplied by selector 21 in the present specification, the signal from color encoder 19 is identified as encoded signal Eenc. The signal produced by mixing encoded signal Eenc and black burst signal Black Burst, when added to the pedestal level, is identified as composite color video signal Esit.

A pedestal level signal generator 23 generates a pedestal signal P which is added to composite color video signal Esit in adding circuit 22. Composite color video signal Esit with the pedestal level is then converted into an analog signal in digital to analog converter 24.

In the preferred embodiment, pedestal signal P normally has a digital value of "60". The pedestal level of the video information signal can be increased from a digital value of "60" to a digital value of "71" during a camera set up operation. More specifically, when the video camera is setup, a setup switch (not shown) can be actuated to supply a setup signal Ssetup to pedestal level signal generator 23. Pedestal level signal generator 23 establishes the digital value of the pedestal signal P at a digital value of "71" in response to setup signal Ssetup.

A color blanking signal C-Blank is supplied to pedestal level signal generator 23 and is used to prevent the pedestal level from increasing in value when the video signal information is absent. It is to be appreciated that the pedestal level can be increased under the proper circumstances when the video signal information is present because the black level must be properly deviated or biased from a predetermined pedestal level. Such adjustment may be made in response to various conditions such as the characteristics of the the video camera, the amount of light in the scene being photographed, the desired video effects and the like.

Figure 4:
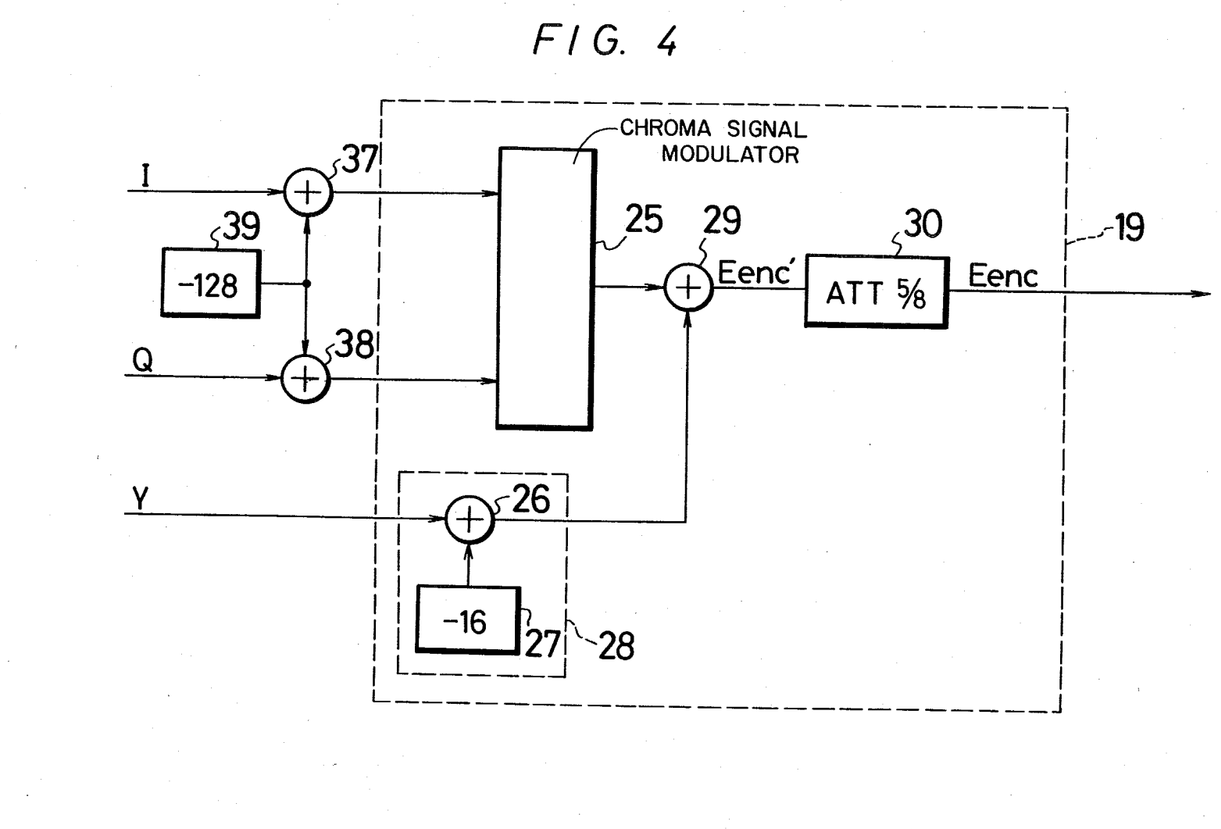
FIG. 4 is a block diagram of an embodiment of a digital color video signal encoder in accord with the present invention.

In the digital color video signal encoder of FIG. 4, chrominance signals I and Q are supplied to a chrominance signal modulating circuit 25 which generates a modulated chrominance signal therefrom in accord with the following equation:

$$Q\sin(\omega csc \cdot t + 33°) + I\cos(\omega csc \cdot t + 33°)$$

Luminance signal Y is supplied to a level adjusting circuit 28 which adjusts the level thereof. The level adjusted luminance signal Y is added with the modulated chrominance signal in an adding circuit 29 to generate an encoded signal Eenc'. Encoded signal Eenc' is supplied to an attenuating circuit 30, which, in the illustrated embodiment, compresses the dynamic range of encoded signal Eenc' by a factor $\frac{2}{3}$. Attenuating circuit 30 generates encoded signal Eenc which is supplied to selector 21 (see FIG. 2).

For the purposes of the present specification, the phrase "Eenc'" indicates an encoded color video signal before the attenuation operation has been performed, while the phrase "Eenc", without a prime designation, indicates an encoded color video signal after the attenuation operation has been performed.

Figure 3A:
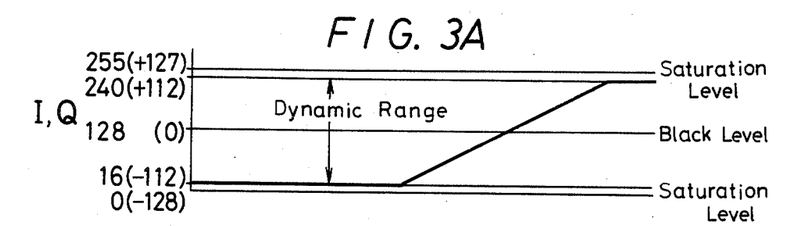
FIGS. 3A to 3F are diagrams of the signals generated by a digital color video signal encoder in accord with the present invention and to which reference will be made in explaining the operation of the present invention.

As illustrated in FIG. 3A, chrominance signals I and Q have a black level digital value of "128". The tolerance or limiting range of a digital value of "16" is provided at the lower limit of the signals, and tolerance or limiting range of a digital value of "15" is provided at the upper limit of the signals. In the illustrated embodiment, chrominance signals I and Q comprise 8-bit words, so that signals I and Q can assume 256 graduations or steps. Thus, chrominance signals I and Q have a minimum saturation level of a digital value of "16", and a maximum saturation level of a digital value of "240". As illustrated in FIG. 3A, therefore, chrominance signals I and Q have a dynamic range from a digital value of "16" to a digital value of "240".

It is conventional for the digital chrominance signals from band-pass filters 17 and 18 (see FIG. 2) to be expressed as two's complement signed binary numbers. Thus, the digital chrominance signals I, Q range from a digital value of "minus 112" to "plus 112", as indicated in parenthesis on the vertical axis in FIG. 3A. In FIG. 4, adding circuits 37, 38 and a level adjusting circuit 39 adjust the values of the digital chrominance signals I and Q before being supplied to chrominance signal modulating circuit 25.

Figure 3B:
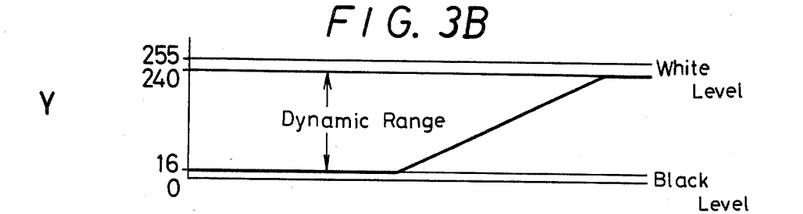

FIG. 3B illustrates the dynamic range of luminance signal Y. Luminance signal Y has a black level signal with a digital value of "16", and a white level signal with a digital value of "240".

The color encoder 19 of FIG. 4 includes level adjusting circuit 28 because the black level luminance signal Y is offset by a digital value of "16". However, luminance signal Y from matrix circuit 16 (see FIG. 2) is added to the modulated chrominance signal (from chrominance signal modulating circuit 25) in adding circuit 29 to generate encoded signal Eenc'. In order to obtain an accurate encoded signal Eenc' from the addition of luminance signal Y and chrominance signals Q, I, the black levels of the two signals must be adjusted by subtracting the offset amount "16" from luminance signal Y. Thus, a level adjusting circuit 27 supplies a digital value of "minus 16" to an adding circuit 26 to which luminance signal Y is also supplied. In effect, luminance signal Y has the digital value of "16" subtracted therefrom before it is added in adding circuit 29 with chrominance signals Q, I from chrominance signal modulating circuit 25.

Figure 3C:
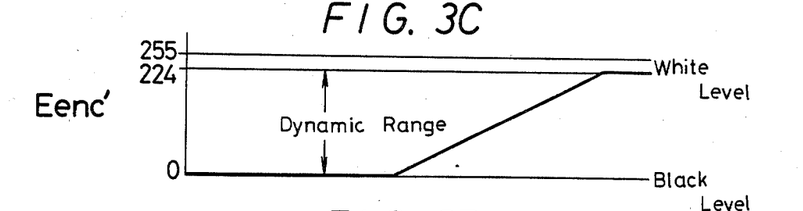
Figure 3D:
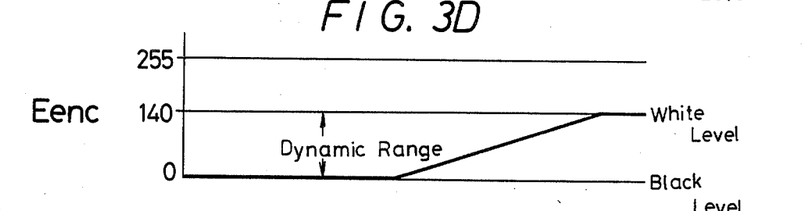

It is to be appreciated that encoded signal Eenc' has a dynamic range which is as wide as possible and ranges from a digital value of "0" to a digital value of "224", as indicated in FIG. 3C. The signal of FIG. 3C illustrates a video signal in which only the black and white components are present. Consequently, if the pedestal level signal is directly supplied to encoded signal Eenc', the digital value thereof will exceed the digital value of "255" since the chrominance signals will be superimposed thereon. Therefore, encoded signal Eenc' must be attenuated so that its maximum value does not overflow the maximum value possible with an 8-bit word. Attenuating circuit 30 thus attenuates the digital value of encoded signal Eenc' and, in the illustrative embodiment, has an attenuating ratio of $\frac{5}{8}$. Attenuating circuit 30 generates encoded signal Eenc which has a dynamic range of the 140 graduations or steps (where the value of 140 is the product of $\frac{5}{8}$ and 224.) FIG. 3D illustrates encoded signal Eenc which has a dynamic range from a digital value of "0" to a digital value of "140".

Figure 3E:
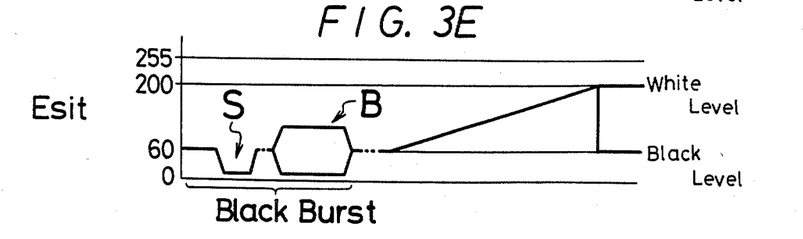
Figure 3F:
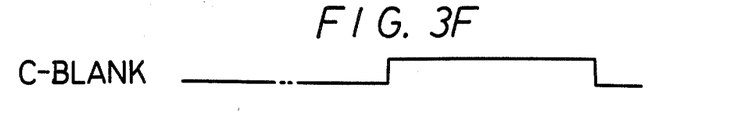

FIG. 3E illustrates composite color video signal Esit in which black burst signal Black Burst has been mixed with encoded signal Eenc along with a pedestal level signal.

Figure 5:
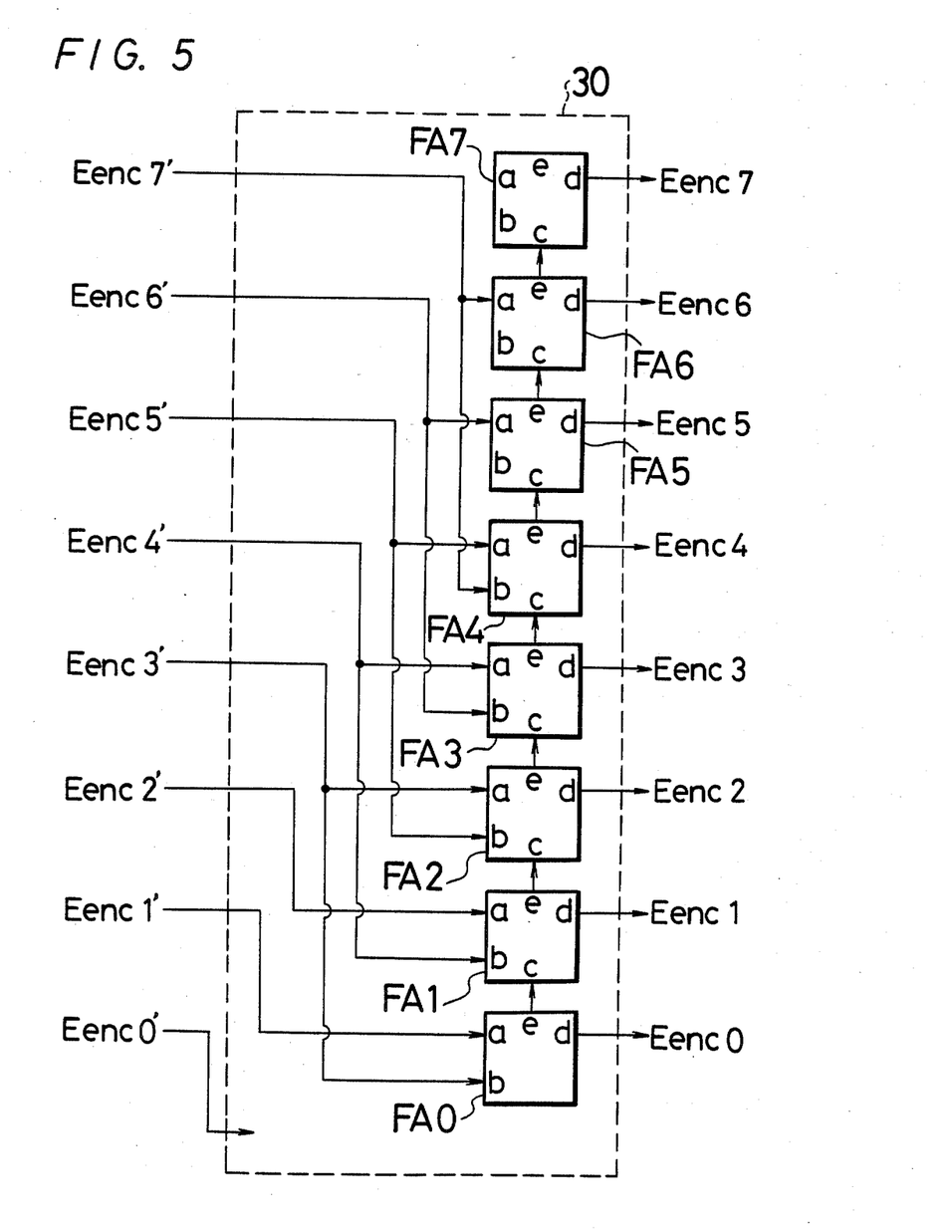
FIG. 5 is a block diagram illustrating an attenuating circuit included in the embodiment of FIG. 4.

Attenuating circuit 30 of FIG. 4 is illustrated in greater detail in FIG. 5 and includes 8 full-adders FA0 to FA7 comprising an adding circuit. Each full-adder FA0 to FA7 includes an added number input terminal a, an adding input terminal b, a carry input terminal c, an added result output terminal d and a carry output terminal e.

In the illustrated embodiment, attenuating circuit 30 attenuates input signal Eenc' by a factor of $\frac{5}{8}$. Since $\frac{1}{2}$ Eenc' $+\frac{1}{8}$ Eenc' $=\frac{5}{8}$ Eenc', a signal having a digital amount $\frac{1}{2}$ as large as encoded signal Eenc' is added to a signal having a digital amount $\frac{1}{8}$ as large as encoded signal Eenc' to derive an output signal Eenc which is $\frac{5}{8}$ Eenc'. Attenuating circuit 30 generates a digital signal having a digital amount $\frac{1}{2}$ as large as as encoded signal Eenc' by shifting the bits comprising one word by one bit to the right. Attenuating circuit 30 generates a signal having a digital amount $\frac{1}{8}$ as large as encoded signal Eenc' by shifting the bits of one word by 3 bits (since $\frac{1}{2}^3 = \frac{1}{8}$).

The generation of the signal of $\frac{1}{2}$ Eenc' is next to be described. A signal Eenc 7' corresponding to the seventh bit of one word of encoded signal Eenc' is supplied to full-adder Fa6 corresponding to the sixth bit of the output word. A signal Eenc 6' corresponding to the sixth bit of one word from encoded signal Eenc' is supplied to full-adder FA5 corresponding to the fifth bit of the output word. Similarly, the signal of each bit forming encoded signal Eenc' is supplied to the full-adder to of a bit number which is lower by one than the bit number of the input signal. In effect, the bits comprising each input word are shifted to the right by one digit, thereby halving the value of each word.

The generation of the signal $\frac{1}{8}$ Eenc' is next to be described. Signal Eenc 7' corresponding to the seventh bit of one word is supplied to full-adder FA4 corresponding to the fourth bit of the output word. Signal Eenc 6' corresponding to the sixth bit of one word is supplied from encoded signal Eenc' to full-adder FA3 corresponding to the third bit of the output word. Similarly, each bit forming encoded signal Eenc' is supplied through the full-adder corresponding to three lower bit numbers. In effect, the bits comprising each input word are shifted to the right by three digits, thereby dividing the value of each word by eight. Thus, encoded signal Eenc' is multiplied by $\frac{1}{2}^3$ or $\frac{1}{8}$).

In accord with FIG. 5, therefore, encoded signal $\frac{1}{2}$ Eenc' is supplied to the added number input terminal a of each of full-aders FA0 to FA6, while the encoded signal $\frac{1}{8}$ Eenc' is supplied to the adding number input terminal b of each of full-adders FA0 to FA4, respectively.

Since the digital color video signal encoder of FIG. 4 includes an attenuating circuit 30 for attenuating encoded signal Eenc', the dynamic ranges of the component signals (luminance signal Y and chrominance signals I and Q) are not restricted to the dynamic range of the video information signal or composite video signal Esit. Each component signal I, Q, and Y has a large dynamic range which is limited only by the minimum necessary tolerance or limiting range of the upper and lower limits of the digital signal. In the illustrated embodiment, in which 8-bit words are utilized, each component signal ranges from a digital value of "0" to a digital value of "255". The dynamic range of the component signals I, Q, and Y is compressed before being mixed with the black burst signal. Accordingly, the effects of quantum noise in luminance signal Y and chrominance signals I and Q can be reduced.

Since level adjusting circuit 28 performs a level adjusting operation so as to set a predetermined relationship between the black levels of chrominance signals I and Q and luminance signal Y, it is possible to set the offset amount of the black level of, for example, luminance signal Y, to a desired value. Thus, the dynamic ranges of the component signals, namely, luminance signal Y and chrominance signals I and Q, are wide without undue restriction from the dynamic range of the video information signal in the composite color video signal. Accordingly, the effects of quantum noise in the luminance signal and the chrominance signals can be reduced.

A digital color video signal encoder according to the present invention includes a level adjusting circuit 28 which adjusts the level of the luminance signal Y supplied thereto so that the black levels of the digitized luminance signal and the digitized chrominance signals have a predetermined relationship therebetween.

It is to be appreciated from the above description of an embodiment of the present invention that the black levels of the luminance signal and the chrominance signals can be independently set before the adjusted signals are supplied to the digital color video signal encoder.

Figure 6:
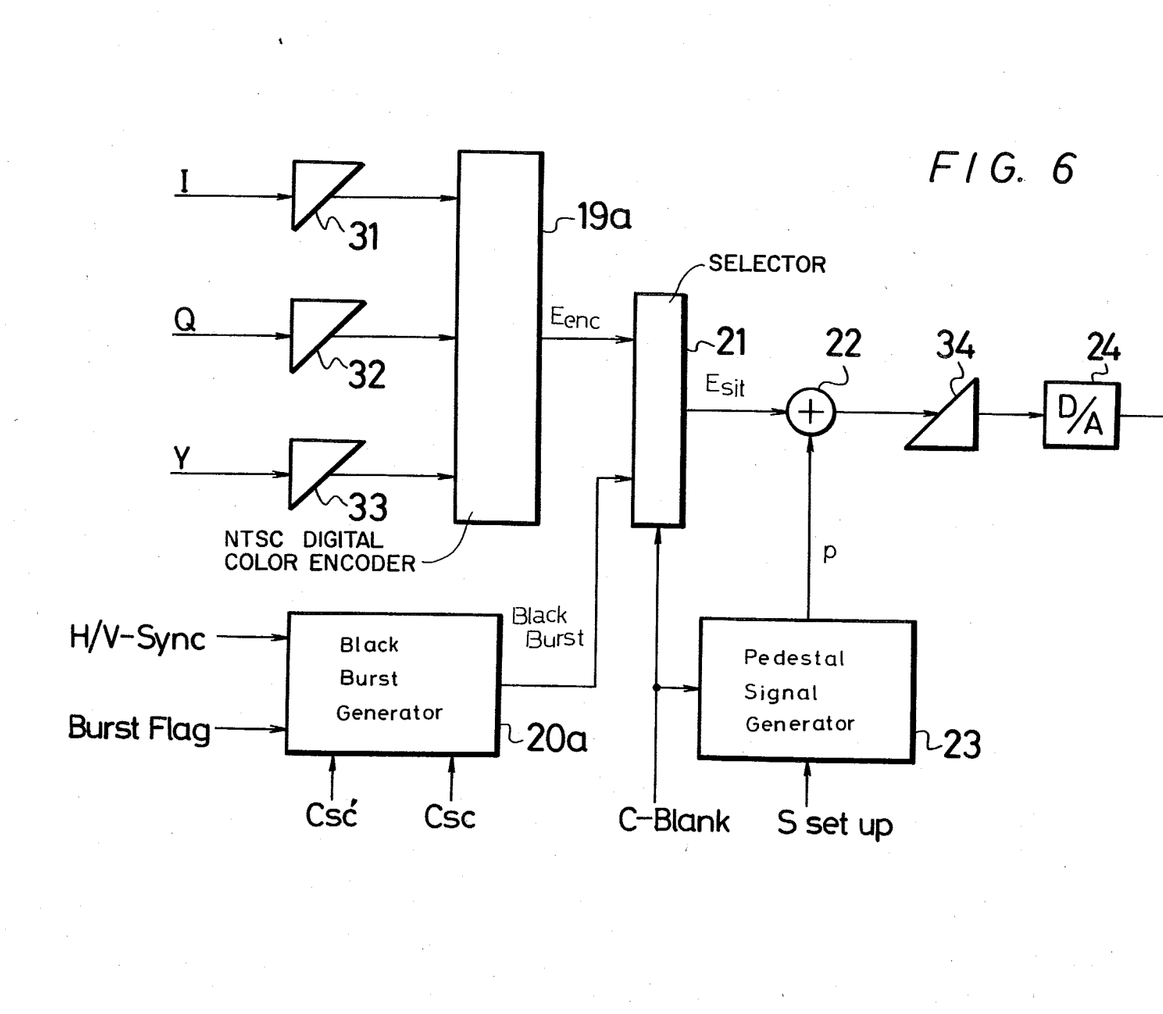
FIG. 6 is a block diagram illustrating a portion of a color video camera having an alternate embodiment of a digital color video signal encoder according to the present invention.

FIG. 6 illustrates a portion of a color video camera including an alternate embodiment of a digital color video signal encoder 19a. In the color video camera of FIG. 6, the bits comprising the words of the digital signals are delayed by incrementally increasing amounts from one bit to the next. As described more fuly hereinbelow, the most significant bits are delayed more than the least significant bits. The bits of each word are delayed in the embodiment of FIG. 6 because the adding circuits comprising NTSC color encoder 19a are made of low speed logic elements which can calculate only one output bit at a time.

In the color video camera of FIG. 2, an adding circuit which adds data of multiple bits, for example, 8-bits, generally comprises high speed logic elements such as TTL (transistor-transistor logic) and ECL (emitter coupled logic). When signals having multiple bit words are added together, an adding operation must be performed in sequential order from the lowest bit to the highest bit in such a way that the least significant bits are added to one another. After the presence or absence of a carry bit is detected, the bits of one higher order are added together. It is to be appreciated that the bits are not simultaneously added together in the absence of a carry-look ahead circuit.

A carry-look ahead circuit is capable of simultaneously adding all of the bits of a word. However, such circuits are quite large, and, when incorporated into a video camera, unreasonable increase the size of the camera. Thus, in order to have a small video camera, the bits must be sequentially added together and not simultaneously.

The sequential addition of the bits comprising the words must be completed within one clock period. In one embodiment, in which 8-bit words are utilized, the sequential addition of the bits can be performed within one period of a clock pulse which has a frequency four times as high as the frequency of the color subcarrier signal. Accordingly, the adding circuit employs high speed logic elements such as TTL, ECL or the like. However, such high speed logic elements prevent the adding circuit from being formed as a chip with a high integration value and low power consumption. The color video camera of FIG. 6 employs a low speed operation CMOS (complementary metal oxide semiconductor) logic element for the adding circuit which, unlike TTL or ECL logic elements, has a high integration value and low power consumption.

Returning to FIG. 6, the color video camera depicted therein includes delay circuits 31, 32, 33. Delay circuit 31 delays chrominance signal I before it is supplied to NTSC color encoder 19a. Delay circuit 32 delays chrominance signal Q. Delay circuit 33 delays luminance signal Y. In addition, a delay circuit 34 is connected between adding circuit 22 and digital to analog converter 24 for delaying the composite color video signal Esit. Delay circuit 34 reverses the delays imparted to the video signal by delay circuits 31, 32, 33, as described more fully hereinbelow.

Figure 7:
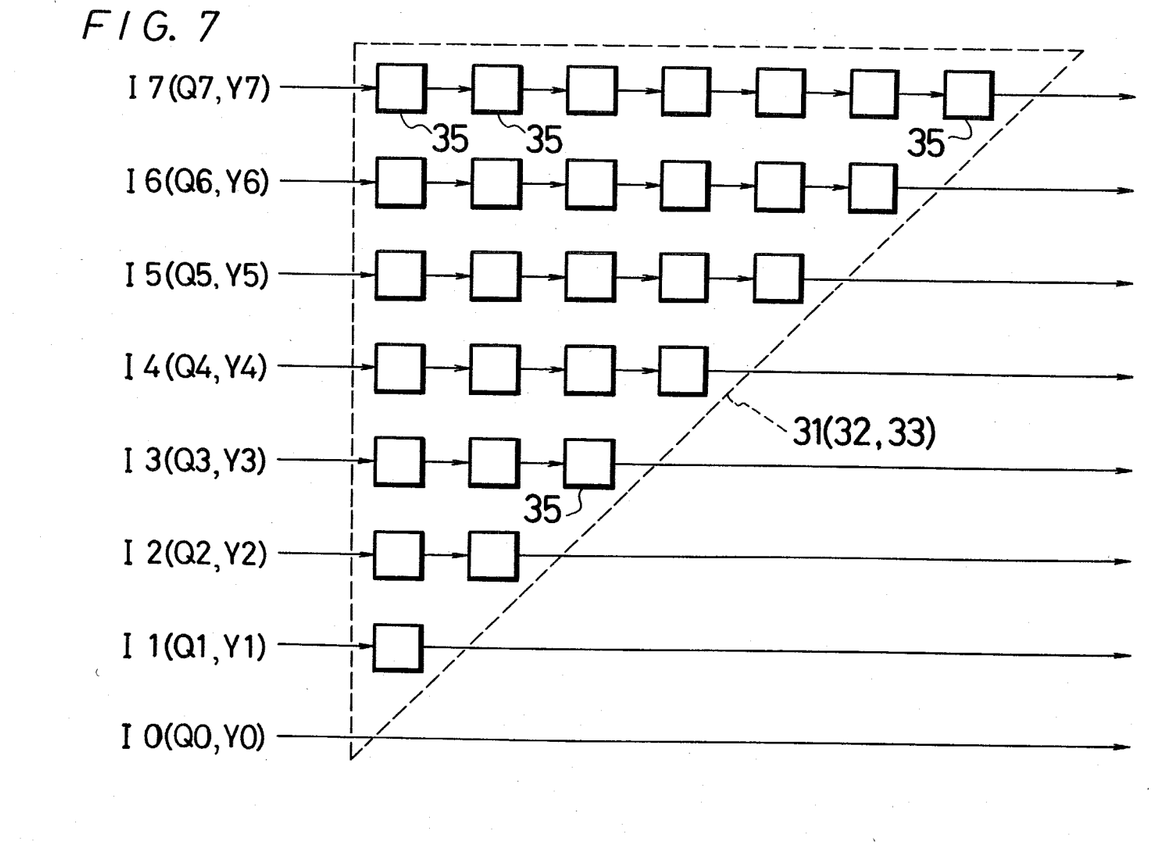
FIG. 7 is a block diagram of a delay circuit included in the color video camera of FIG. 6.

As illustrated in FIG. 7, each of delay circuits 31, 32, 33 comprises a large number of delay elements 35, each of which delays the signal supplied thereto by one period amount of a clock pulse. In the illustrated embodiment, the higher or more significant bits are given a larger delay than the lower or less significant bits. In a preferred embodiment, bit number zero is delayed by a zero amount, bit number one is delayed by an amount of one period of the clock pulse, and bit number two is delayed by an amount of two periods of the clock pulse. Accordingly, each bit is delayed a larger amount which increases by one period amount of the clock pulse.

Figure 8:
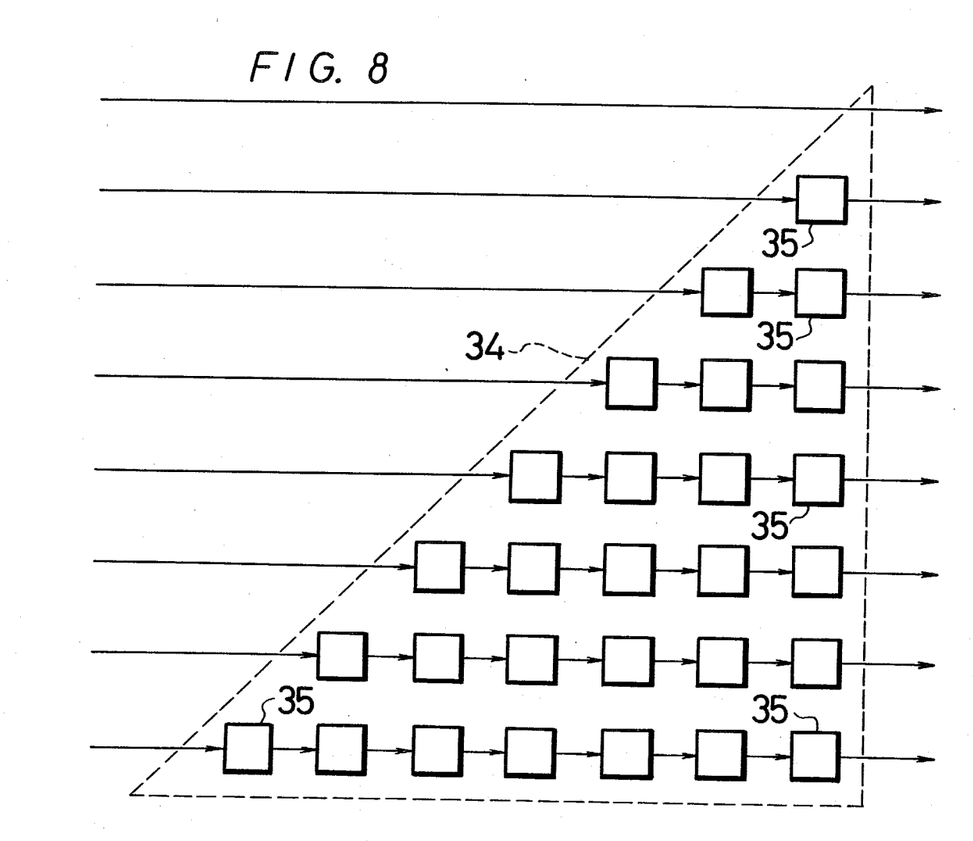
FIG. 8 is a block diagram of a second delay circuit included in the color video camera of FIG. 6.

As illustrated in FIG. 8, delay circuit 34 also comprises a large number of delay elements 35, each of which delays a signal by one period of a clock pulse in the same manner as the delay circuits 31, 32, 33. Unlike delay circuits 31, 32 and 33, however, delay circuit 34 does not delay the most significant bit for any amount. On the other hand, the lower or less significant bits are given a larger delay which increases by one period of the clock pulse for each bit. Thus, the delay amount for the least significant bit is seven times the period of a clock pulse.

In NTSC color encoder 19a, each calculation must be performed at a processing speed of one bit per one period of the clock pulse. The bits of the words comprising digital chrominance signals I, Q and digital luminance signal Y are sequentially supplied from the least significant bit to the most significant bit to NTSC color encoder 19a at one period for each clock pulse. Thus, each bit section of adding circuit 29 (see FIG. 4) within NTSC color encoder 19a and adding circuit 22 performs a calculation step for one bit within one period of the clock pulse. A person of ordinary skill in the art can thus appreciate why chrominance signals I, Q and luminance signal Y are supplied to NTSC color encoder 19a through delay circuits 31, 32, and 33. It is to be further appreciated that adding circuits 22, 29 can be CMOS circuits which are low speed logic elements and which have a high integration value and low power consumption.

Delay circuit 34 connected between adding circuit 22 and digital to analog converter 24 cancels out the delay amounts supplied to the bits of composite video signal Esit from adding circuit 22. As is apparent from the discussion above, the bits comprising output signal Eenc from NTSC color encoder 19a and the bits comprising the output signal from adding circuit 22 are sequentially outputted in order beginning with the least significant bit. Accordingly, if delay circuit 34 delays the least significant bit the largest amount and the most significant bit the least amount, all the bits of each word of the digital signals are supplied to the digital to analog converter 24 at the same time. Black burst signal Black Burst from black burst signal generator 20a is supplied through delay circuit 34 to digital to analog converter 24. Accordingly, black burst signal Black Burst must be delayed an amount which increases for the higher bits in a fashion similar to that of luminance signal Y and chrominance signals I, Q. Accordingly, black burst signal generator 20a of FIG. 6 includes delay elements or circuits (not shown) having an appropriate delay. An attenuating circuit 30a of FIG. 9 includes delay elements or circuits 36 each of which delays the bits supplied thereto. Attenuating circuit 30a, of course, is most advantageously employed in the digital color video signal encoder 19a of FIG. 6.

Figure 9:
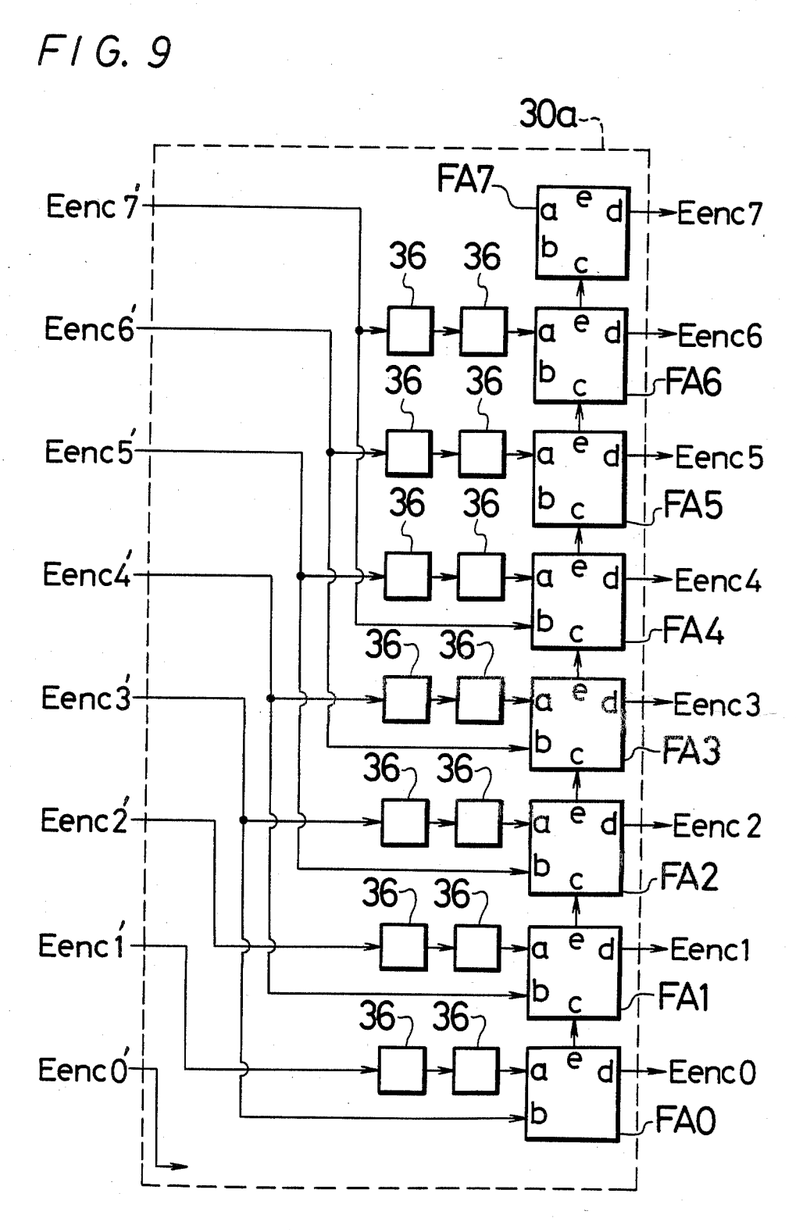
FIG. 9 is a block diagram illustrating an attenuating circuit included in the color video camera of FIG. 6.

Attenuating circuit 30a includes two delay elements 36 in the stage before the added number input terminal a of each full-adder FA0 to FA6. More specifically, delay elements 36 impart a delay to the signal which is supplied to the terminal for multiplying encoded signal Eenc' by one-half.

Two delay circuits 36 are included in the stage before the added input terminal A, and the reason is next to be explained. Since the bit-slice type delay circuit of FIG. 7 is employed, each bit of encoded signal Eenc' to be supplied to the added number input terminal a of each full-adder FA0 to FA7 is decreased in order by two from the corresponding bits of encoded signal Eenc' which are supplied to the adding number input terminal b. Hence, the delay amount of the signal supplied to the added number input a is decreased by two periods of the clock pulse which will be supplied to the adding input terminal b. The delay amount of the signal to be supplied to the added number input terminal a is increased by two period amounts by the two delay elements 36 so as to be equal to that of the signal which will be supplied to adding number input terminal b.

In the aforedescribed embodiments, the dynamic ranges of luminance signal Y and chrominance signals I and Q range from a digital value of "16" to a digital value of "240". The attenuating ratio of attenuating circuit 30 is ⅝, and the dynamic range of the video information signal in composite signal Esit has 140 steps or graduations. It is to be appreciated that these values are merely for the purpose of explanation, and the dynamic ranges of the respective signals and the attenuating ratio of the attenuating circuit are not limited to those precise examples.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. A digital encoder for use with digital luminance and chrominance signals having black levels and each being constituted by n bit words, said encoder comprising:

level adjusting means for adjusting said chrominance and luminance signals to establish a predetermined relationship between said black levels of the level-adjusted chrominance and luminance signals;

chrominance signal modulating means for generating a modulated chrominance signal from said level-adjusted chrominance signal;

adding means receiving said modulated chrominance signal and said level-adjusted luminance signal and providing an encoded color video signal therefrom within a dynamic range limited by the number n of the bits in said words;

attenuator means for attenuating said encoded color video signal; and means for combining sync and burst signals with the attenuated encoded color video signal and with a predetermined pedestal level to provide a level-adjusted composite color video signal within said dynamic range and constituted by n bit words.

2. The digital encoder of claim 1; in which said attenuator means comprises:

a plurality of full adder means; and means for supplying said bits to said full adder means to produce the attenuated encoder color video signal.

3. The digital encoder of claim 2; in which said attenuator means further includes means for supplying at least one of said bits in each of said words to two of said full adder means.

4. The digital encoder of claim 2; in which said means for combining comprises means for generating a digital black burst signal including a digital horizontal sync signal, a digital vertical sync signal, and a digital burst signal; and selector means for alternately supplying said black burst signal and said attenuated encoded color video signal to provide a composite output signal therefrom.

5. The digital encoder of claim 4; in which said means for combining further comprises pedestal level generating means for generating a pedestal level signal; and second adding means receiving said pedestal level signal and said composite output signal and providing said level-adjusted composite color video signal.

6. The digital encoder of claim 5; and further comprising delay means for selectively delaying said bits of each of said words constituting said chrominance and luminance signals and supplying the selectively delayed bits to said chrominance signal modulating means.

7. The digital encoder of claim 6; in which said delay means delays each of said bits of each of said words by a different amount.

8. The digital encoder of claim 6; in which said delay means delays each of said bits by an incrementally increasing amount.

9. The digital encoder of claim 8; in which said delay means delays the most significant of said bits more than the least significant of said bits.

10. The digital encoder of claim 9; and further comprising second delay means for selectively delaying the bits comprising said level-adjusted composite color video signal by amounts that increase incrementally from the most significant to the least significant of said bits.

11. The digital encoder of claim 10; wherein said attenuator means includes third delay means for delaying said bits supplied to added number input terminals of said full adder means.

12. The digital encoder of claim 1; in which each of said digital signals is constituted by eight bit words; and wherein said attenuator means provides the attenuated encoded color video signal with white and black peak levels having one hundred forty graduations therebetween.

* * * * *